United States Patent
Ureche et al.

(10) Patent No.: US 8,341,430 B2
(45) Date of Patent: Dec. 25, 2012

(54) EXTERNAL ENCRYPTION AND RECOVERY MANAGEMENT WITH HARDWARE ENCRYPTED STORAGE DEVICES

(75) Inventors: Octavian T. Ureche, Renton, WA (US); Scott A. Brender, Kirkland, WA (US); Karan Mehra, Sammamish, WA (US); David Rudolph Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 12/245,064

(22) Filed: Oct. 3, 2008

(65) Prior Publication Data

US 2010/0088525 A1 Apr. 8, 2010

(51) Int. Cl.
*G06F 12/14* (2006.01)
(52) U.S. Cl. ......................... 713/193; 713/194
(58) Field of Classification Search ................. None
See application file for complete search history.

(56) References Cited

U.S. PATENT DOCUMENTS

| | | | | |
|---|---|---|---|---|
| 5,754,853 | A * | 5/1998 | Pearce | 713/2 |
| 7,725,703 | B2 * | 5/2010 | Hunter et al. | 713/2 |
| 7,971,069 | B2 * | 6/2011 | Yellepeddy | 713/189 |
| 8,108,693 | B2 * | 1/2012 | Atzmon et al. | 713/193 |
| 2002/0184494 | A1 * | 12/2002 | Awadalla | 713/160 |
| 2003/0028765 | A1 | 2/2003 | Cromer et al. | |
| 2003/0070083 | A1 | 4/2003 | Nessler | |
| 2005/0262361 | A1 * | 11/2005 | Thibadeau | 713/193 |
| 2006/0272027 | A1 | 11/2006 | Noble | |
| 2007/0180210 | A1 | 8/2007 | Thibadeau | |
| 2007/0214369 | A1 | 9/2007 | Roberts et al. | |
| 2008/0077800 | A1 | 3/2008 | Wang et al. | |
| 2008/0151740 | A1 | 6/2008 | Atzmon et al. | |
| 2008/0155680 | A1 | 6/2008 | Guyot et al. | |
| 2008/0162947 | A1 | 7/2008 | Holtzman et al. | |

OTHER PUBLICATIONS

Pariseau, Beth, "Seagate, Hitachi Working on Disk Encryption", Retrieved at <<http://searchstorage.techtarget.com/news/article/0,289142,sid5_gci1112003,00.html>>, Aug. 1, 2005, pp. 3.
"FinallySecure", Retrieved at <<http://www.secude.com/download/htm/10255/en/Fs-flyer-en.pdf>>, pp. 2.
Ou, George, "Photos: Secure your Hard Drive with Windows Vista BitLocker", Retrieved at <<http://www.zdnet.com.au/insight/software/soa/Photos-Secure-your-hard-drive-with-Windows-Vista-BitLocker/0,139023769,339274056,00.htm>>, Mar. 6, 2007, pp. 3.
Hynes, Byron, "Keys to Protecting Data with BitLocker Drive Encryption", Retrieved at <<http://technet.microsoft.com/en-us/magazine/cc138009(TechNet.10).aspx>>, Jul. 16, 2008, pp. 8.

(Continued)

*Primary Examiner* — Philip Chea
*Assistant Examiner* — Fatoumata Traore

(57) ABSTRACT

Hardware encrypting storage devices can provide for hardware encryption of data being written to the storage media of such storage devices, and hardware decryption of data being read from that storage media. To utilize existing key management resources, which can be more flexible and accommodating, mechanisms for storing keys protected by the existing resources, but not the hardware encryption of the storage device, can be developed. Dedicated partitions that do not have corresponding encryption bands can be utilized to store keys in a non-hardware-encrypted manner. Likewise, partitions can be defined larger than their associated encryption bands, leaving room near the beginning and end for non-hardware encrypted storage. Or a separate bit can be used to individually specify which data should be hardware encrypted. Additionally automated processes can maintain synchronization between a partition table of the computing device and a band table of the hardware encrypting storage device.

19 Claims, 8 Drawing Sheets

OTHER PUBLICATIONS

"Sun Storagetek Crypto Key Management System", Retrieved at <<http://www.sun.com/encryption/Encryption_WP.pdf>>, "Selecting an Appropriate Encryption Method for the Enterprise Environment", White Paper, Jan. 2008, pp. 16.

"Protecting your Business from Costly Data Theft: Why Hardware-Based Encryption is the Answer", Retrieved at <<http://www.wave.com/about/whitepapers/DAR&FDE_WP_1.04.pdf>>, Mar. 2007, pp. 5.

* cited by examiner

EXTERNAL ENCRYPTION AND RECOVERY MANAGEMENT WITH HARDWARE ENCRYPTED STORAGE DEVICES

BACKGROUND

Modern portable computing devices often provide more than adequate computing resources, causing their popularity to increase over more traditional, non-portable computing devices. Unfortunately, portable computing devices introduce risks not often associated with non-portable computing devices. Foremost among these risks is the risk of data protection when the computing device itself may be lost, stolen or otherwise end up wholly within the possession of unknown or malicious users.

Traditionally, the data contained within a volume of data, which is typically stored on a data storage hardware device, such as a hard drive, is protected from unauthorized access by the computer-executable instructions of the computing device to which the data storage device is communicationally coupled. If the data storage device were, however, to be communicationally decoupled from a host computing device having such protective computer-executable instructions, the data could be accessed and its security compromised. Thus, a user with access to the host computing device, such as a malicious user who has obtained a lost or stolen portable computing device, can physically remove one or more data storage devices from such a portable computing device, and seek to obtain information from such data storage devices outside of the context of the portable computing device.

To prevent such unauthorized access of data, the notion of "full volume encryption" was developed, whereby all of the relevant data stored on a data storage device was stored in an encrypted manner. Consequently, even if such a data storage device were to be independently accessed, through a computing device having no executable instructions for the protection of the data, the data could, nevertheless, remain protected, since it would be physically stored in an encrypted manner.

To increase the efficiency of such full volume encryption, the task of encrypting and decrypting data can be performed by hardware associated with the storage device itself, instead of by the central processing unit of the host computing device. Such hardware encrypting storage devices appear, to higher level components, such as the operating system or application software, as traditional storage devices. However, upon receiving data for storage, such hardware encrypting storage devices automatically encrypt the data before placing it on the storage medium. Similarly, when reading data, a hardware encrypting storage device will read the data from the storage medium and decrypt it first, before providing it to higher level components.

Full volume encryption implemented by computer-executable instructions executing on the host computing device, as opposed to by the hardware of the storage device itself, can, however, provide greater flexibility. Specifically, whether implemented by the storage device or the computing device, to limit access to data protected by full volume encryption, the key used to encrypt and decrypt the data can be protected, such as by a password, a key card, a Trusted Platform Module, or similar security device. Unfortunately, should a user lose access to such a security device, a new key would need to be generated. Such a new key would require that the data be encrypted in such a manner that the new key could decrypt it. Consequently, the creation of such a new key would entail the computationally expensive, and lengthy, process of decrypting the volume and, subsequently, reencrypting it in such a manner that the new key could decrypt it. To avoid such inefficiencies, full volume encryption performed by a computing device, as opposed to by the storage device itself, can add one or more layers of indirection. Specifically, the key that can decrypt the data can, itself, be encrypted by another key. This second key can then be protected by a security device. Should a user lose access to the security device, only the second key would need to be changed, requiring only the decryption, and subsequent reencryption, of the first key, and not of all of the data itself. Unfortunately, full volume encryption performed by storage devices, such as hard disk drives, does not utilize such layers of indirection.

SUMMARY

Hardware based encryption and decryption performed by a storage device, instead of by computer-executable instructions executing on the computing device, can be utilized by such computer-executable instructions to more efficiently perform the actual encryption and decryption, while the computer-executable instructions themselves can retain control of other aspects of the encryption methodologies, such as the protection and maintenance of keys utilized to perform the encryption and decryption. By retaining key management responsibilities, the computer-executable instructions executing on the computing device can take advantage of existing key management mechanisms to provide for ease of recovery from lost or forgotten passwords, ease of backup or other recovery operations, and similar efficiencies. However, to retain such key management responsibilities, the computer-executable instructions executing on the computing device can seek to store encrypted versions of keys on the storage media of the storage device without additionally encrypting them with the hardware based encryption of the storage device In one embodiment, computer-executable instructions executing on the computing device can store encrypted keys, and, once decrypted, the keys can be utilized by the hardware of the storage device to encrypt and decrypt data, within a system partition that is designed to remain unencrypted and not user accessible. If multiple partitions are created and hosted by a single storage device, each of the keys of the multiple partitions can be retained in the system partition. To decrease the risk of a hardware or storage error rendering such keys irretrievable, multiple redundant copies of such keys can be stored in disparate sections of the system partition.

In another embodiment, computer-executable instructions executing on the computing device can store encrypted keys in a reserved partition that can be reserved by the operating system when formatting a storage device. Such a reserved partition, unlike a system partition, can exist on storage devices even though no volume hosted by the storage device comprises an operating system that can boot the computing device.

In an additional embodiment, computer-executable instructions executing on the computing device can store encrypted keys near the beginning of a partition, and redundant keys near the end of a partition, by defining the encrypted band of the hardware encrypting storage device to be smaller than the partition, leaving space at the beginning and end of the partition that is not part of an encrypted band and is, instead, part of the unencrypted global band of the storage device. In such a way, the encrypted keys can be stored and retrieved by computer-executable instructions executing on the computing device without additional reencryption and decryption by the storage device.

In a further embodiment, a flag, or bit, can be defined and passed with data provided to, and retrieved from, the hardware encrypting storage device. The bit can specify whether the data provided to the hardware encrypting storage device is to be encrypted by the storage device, or not. Consequently, encrypted keys can be stored anywhere on the hardware encrypting storage device without additional encryption by that device, through the setting of this bit.

In a still further embodiment, computer-executable instructions executing on the computing device can monitor the partition table maintained on the computing device, specifying the partitions present on the hardware encrypting storage device, and can synchronize the band table of the hardware encrypting storage device thereto automatically. The band table of the hardware encrypting storage device can, thereby, automatically reflect changes to the partitions present on the storage device.

In a yet further embodiment, one or more of the keys used by the hardware encrypting storage device to encrypt and decrypt data can be protected by a trusted platform module of the computing device. Such a key can, thereby, tie the hardware encrypting storage device to the computing device, since such a key can not be provided unless the trusted platform module of the computing device measures the components loaded or executed on the computing device to be the same as they were when the key was originally provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
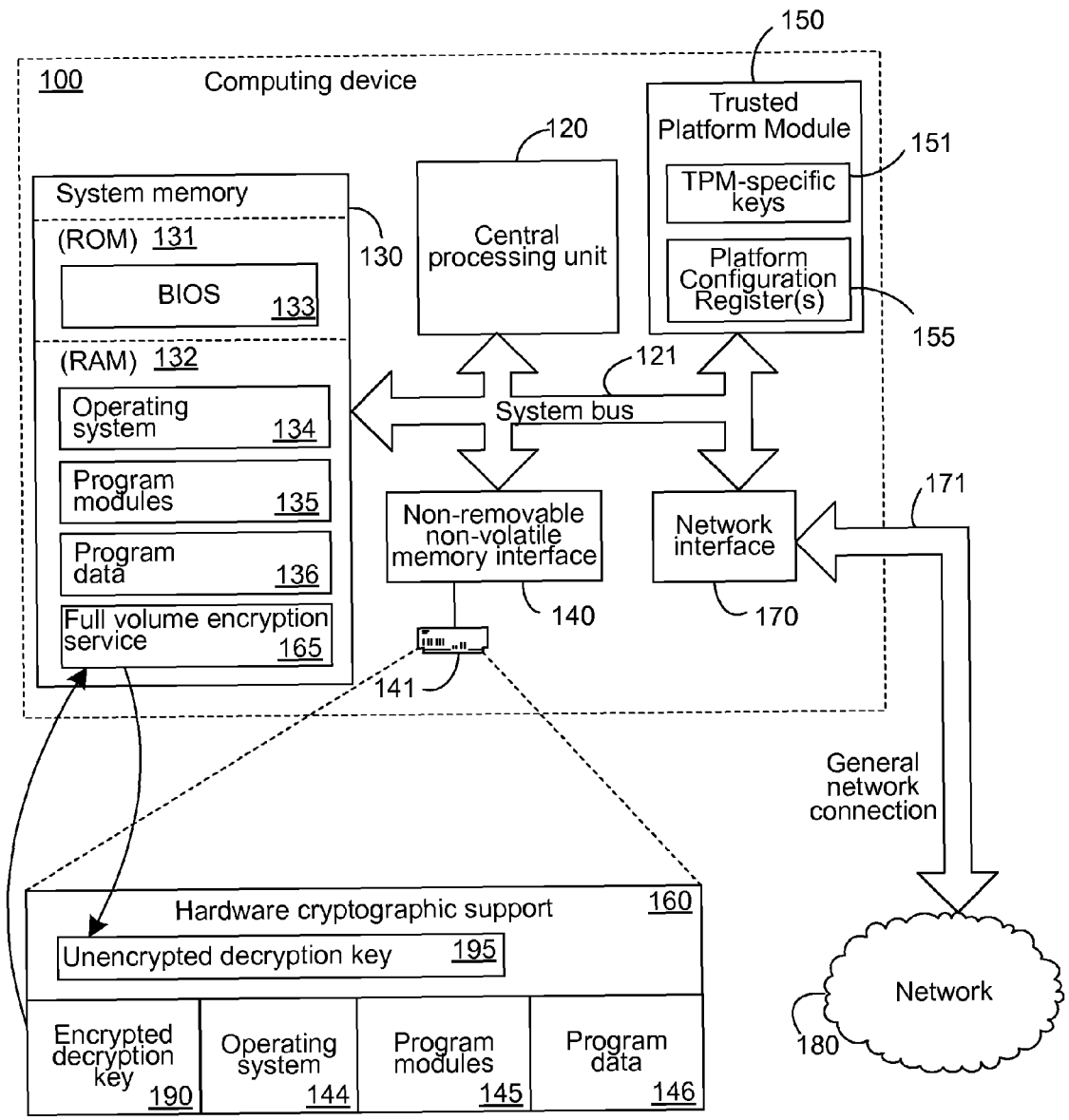
FIG. 1 is a block diagram of an exemplary computing device with a hardware encrypting storage device.

The following description relates to the management, by computer-executable instructions executing on a computing device, of keys used to encrypt and decrypt data by a hardware encrypting storage device. Because the keys can be managed by computer-executable instructions executing on a computing device, they can be protected and encrypted by those instructions and then stored on the storage medium without any further encryption by the hardware encrypting storage medium. Such non-hardware-encrypted storage can occur within a system partition or other reserved partition, or it can occur when an encryption band associated with a partition is sized slightly smaller than the partition, resulting in areas near the beginning and end of the partition that are not covered by the encryption band and are, therefore, not encrypted by the hardware encrypting storage device. Additionally, a flag or bit can be defined as an encryption bit that can specify to the hardware encrypting storage device whether or not to encrypt the data being provided. Automated processes can monitor the partition table and can instruct the hardware encrypting storage device to change its band table in accordance with detected changes to the partition table. Additionally, keys can be protected by a trusted platform module of the computing device to which the hardware encrypting storage device is communicationally coupled such that the keys will only be provided if the state of the computing device does not change, essentially tying the hardware encrypting storage device to the computing device.

The techniques described herein focus on, but are not limited to, the utilization of existing mechanisms directed to both full volume encryption that are implemented by computer-executable instructions executing on a computing device. Indeed, the below described mechanisms can be implemented by any subsystem of the computing device, or even by peripheral hardware. Consequently, while the descriptions below make reference to specific implementations that are designed to interface with these existing mechanisms, the scope of the descriptions themselves is not intended to be so limited.

Additionally, although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is illustrated that can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise encryption keys for the encryption and decryption of information provided to it and it can further store values such that they are protected by the hardware design of the TPM 150 itself. Traditionally, the TPM 150 comprises an initial set of immutable public and private encryption keys that can be utilized, in a known and established manner, to obtain disposable public and private encryption keys. The TPM-specific keys 151 illustrated in FIG. 1 as being stored within the TPM 150 can include any such set of private and public keys, and are not meant to refer to any specific encryption key set. In addition, the TPM 150 can comprise Platform Configuration Registers (PCRs) 155 that can securely store data provided to the TPM 150 by the CPU 120 via the system bus 121. In some embodiments, only specific code executed by the CPU 120 would be permitted to send data to the TPM 150 that would modify the values stored in the PCRs. For simplicity of illustration, the TPM 150 shown in FIG. 1 comprises a single Platform Configuration Register(s) block 155 meant to represent any combination of one or more PCRs.

In addition to the elements described above, the computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. For example, FIG. 1 illustrates a hard disk drive 141 that reads from or writes to non-removable, nonvolatile magnetic media and provides hardware cryptographic support 160, such that the hard disk drive 141 itself can, for example, encrypt data provided to it by other components of the computing device 100, such as the CPU 120, without burdening the CPU 120 with such encryption. Other removable/non-removable, volatile/nonvolatile computer storage media that can be used with the exemplary computing device include, but are not limited to, magnetic tape cassettes, flash memory cards, solid state storage devices (SSDs), digital versatile disks, digital video tape, solid state RAM, solid state ROM, and the like. The hard disk drive 141, or any of these other removable/non-removable, volatile/nonvolatile computer storage media, are typically connected to the system bus 121 through a non-removable memory interface such as interface 140. For ease of illustration and reference, the below descriptions are provided within the context of the illustrated hardware encrypting hard disk drive 141 illustrated in FIG. 1 and subsequently. However, as will be clear to those skilled in the art, none of the below described mechanisms are limited to the magnetic media of the hard disk drive 141 and can be equally implemented on any type of computer storage media, including any of the removable/non-removable, volatile/nonvolatile computer storage media enumerated above.

Although not specifically illustrated in FIG. 1, the hardware cryptographic support 160 of a hardware encrypting storage device, such as the hardware encrypting hard disk drive 141, can comprise a dedicated processor and/or memory for performing cryptographic functions, such as the encryption or decryption of data provided to the hard disk drive or read by the hard disk drive from its storage media. The hardware cryptographic support 160 can also comprise an unencrypted decryption key 195 that can enable the hardware cryptographic support 160 to decrypt and encrypt data stored on the storage media of the hard disk drive 141. As will be described further below, such a key 195 can be stored on the storage media of the hard disk drive 141. For protection, it can be stored in an encrypted state, such as the encrypted decryption key 190 illustrated in FIG. 1.

The drives and their associated computer storage media discussed above and illustrated in FIG. 1, provide storage of computer readable instructions, data structures, program modules and other data for the computing device 100. For example, the hardware encrypting hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

The computing device 100 may operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Of relevance to the descriptions below, one or more of the computer storage media communicationally coupled to computing device 100, such as the hard disk drive 141, may comprise computer readable instructions and data structures that can be encrypted for additional protection. In such a case, as indicated, a decryption key can be utilized by the computing device 100 or by peripherals capable of hardware encryption, such as the hardware encrypting hard disk drive 141, to decrypt and access the computer readable instructions and data structures that are stored in an encrypted form. Traditionally, such a decryption key would be stored in a protected, and encrypted, form, such as the encrypted decryption key 190. When utilized by computer readable instructions executing on the computing device 100, such an encrypted decryption key 190 can be decrypted and retained in an unencrypted state, such as, for example, the unencrypted decryption key 195 provided to the hardware cryptographic support 160 of the hard disk drive 141.

A full volume encryption methodology can be applied to one or more of the computer storage media communicationally coupled to computing device 100, such as the hard disk drive 141. Traditionally, such full volume encryption can be managed and performed by a dedicated full volume encryption service 165 that can execute from RAM 132 and can, in some embodiments, be associated with, for example, the operating system 134. For ease of reference, the key utilized to encrypt and decrypt information, within the context of full volume encryption, will be referred to herein as the "full volume encryption key" (FVEK). The FVEK can be retained in an encrypted state, such as the encrypted decryption key 190, and can be decrypted by, for example, the full volume encryption service 165, after an appropriate set of information, such as a password, person identification number (PIN), keycard, or other such security information, is provided, or after the computing device 100 is verified to be in a trusted state, such as by a TPM 150. More specifically, the FVEK can be encrypted by a key that is associated with such security information or the TPM 150. Unfortunately, should such security information become lost, forgotten, or otherwise rendered unavailable, or should the TPM 150 fail, the FVEK will not be able to be retrieved. In such a case an emergency FVEK can be utilized to decrypt the information stored on the hard disk drive and a new FVEK can be utilized to reencrypt it all.

Of course, the process of decrypting all of the contents of a storage device, such as the hard disk drive 141, and then reencrypting them can be inefficient. To avoid such inefficiencies, an intermediate encryption key can be utilized. For ease of reference, such an intermediate key will be referred to herein as a "volume master key" (VMK). With such a VMK, the FVEK can continue to be utilized to encrypt and decrypt the information stored on, for example, the hard disk drive 141. The FVEK, however, can be encrypted by the VMK and can be stored in an encrypted state, such as the encrypted decryption key 190. The VMK, in turn, can also be encrypted, such as by a key that can be associated with security information, such as a password, PIN, or keycard, or it can be encrypted by a key that can be maintained by the TPM 150. If such security information was lost or forgotten, or if the TPM 150 failed, then an emergency VMK can be utilized to decrypt the FVEK and a new VMK can be created and the FVEK can be reencrypted with that new VMK. Since only the FVEK, as opposed to the entire volume, needs to be decrypted and then reencrypted with a new key, the process of recovering from lost or forgotten security information can be greatly optimized.

In one embodiment, as illustrated in FIG. 1, the hardware cryptographic support 160 provided by a hardware encrypting storage device, such as the hard disk drive 141, can be leveraged to perform the encryption and decryption of data stored on its storage media, while existing mechanisms, such as the existing full volume encryption service 165, can be utilized to maintain and manage the relevant encryption and decryption keys. Thus, as shown in FIG. 1, an encrypted version of a key 190 can be stored on the storage media of the hard disk drive 141 and can be retrieved by the full volume encryption service 165 and provided, to the hard disk drive 141 as a decrypted key 195, which can be retained and utilized by the hardware cryptographic support 160 of the hard disk drive to encrypt and decrypt data being written to, and read from, respectively, the storage media of the hard disk drive. At an appropriate time, such as when the computing device 100 is restarted or shut down, the hardware cryptographic support 160 can discard the decrypted key 195, leaving only the protected encrypted key 190 on the storage media.

Existing resources, such as the full volume encryption service 165, can, as indicated previously, provide for a more robust key management system, whereby lost or forgotten passwords, key cards, damaged TPMs, and the like can be accommodated with a minimum of impact to the user. Additionally, existing resources, such as the full volume encryption service 165, can provide for the recovery of keys in the event of irregular operations, such as after a data loss, software error, or user activity, such as the disconnection of, for example, the hard disk drive 141, from the computing device 100 and the subsequent connection of it to another computing device. However, to leverage existing resources, such as the full volume encryption service 165, mechanisms for enabling such resources to store data on the storage media of, for example, the hard disk drive 141, without having the hardware cryptographic support 160 apply encryption and decryption to the data can be implemented, as described in detail below. Such mechanisms can enable the existing resources to access protected keys, as stored on a hardware encrypting storage device, before providing any encryption or decryption key to the hardware encrypting storage device. Consequently, as shown in FIG. 1, the protected key 190 stored on the storage media can be the same key 195, or associated with the key 195, that is ultimately utilized by the hardware cryptographic support 160 to perform the hardware encryption and decryption of some or all of the other data stored on the storage media.

Figure 2:
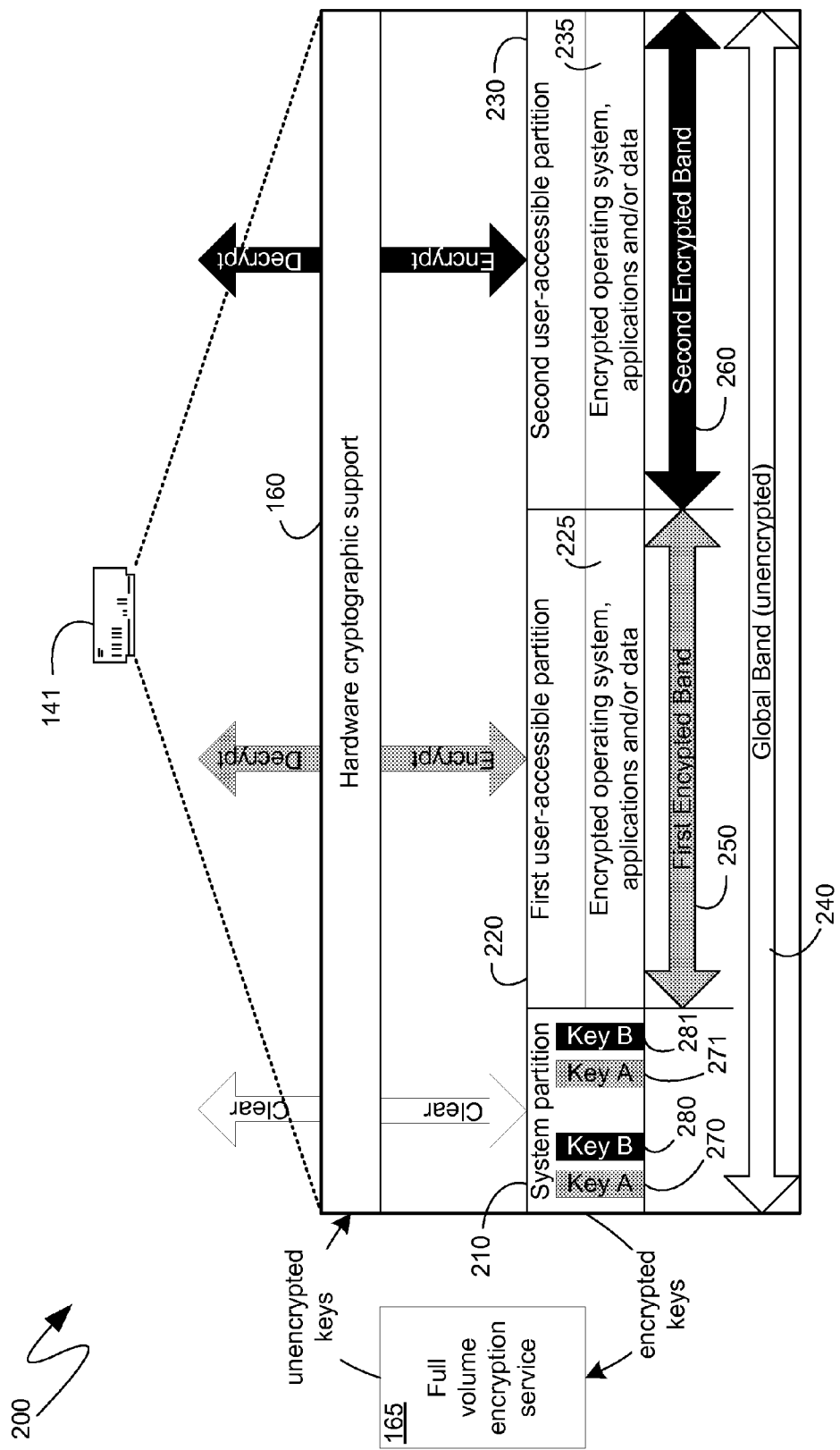
FIG. 2 is a block diagram of an exemplary hardware encrypting storage device having keys stored by computer-executable instructions executing on a computing device communicationally coupled thereto.

In one embodiment, existing resources, such as the full volume encryption service 165, can store information on, for example, the hard disk drive 141, without encryption by the associated hardware cryptographic support 160, by storing such information within a system partition. Turning to FIG. 2, a system 200 illustrates a partitioning and banding scheme, as applied to the hard disk drive 141, that can enable the unencrypted storage of data within a system partition 210. Specifically, the hard disk drive 141 is shown having the hardware cryptographic support layer 160, described previously, and also having a storage media that is partitioned into three partitions, namely: a system partition 210, a first user-accessible partition 220 and a second user-accessible partition 230.

The hard disk drive 141 also comprises a series of bands. As will be known by those skilled in the art, a band can be a contiguous set of Logical Block Addresses (LBAs), or individual storage units on the storage media, and each band can be associated with a single key such that all data to be written to the storage media associated with that band can be encrypted with that key by the hardware cryptographic support 160 and all data to be read from the storage media associated with that band can be decrypted with that key by the hardware cryptographic support. By default, the storage media of the hardware encrypting hard disk drive 141 can comprise a single band that encompasses all of the LBAs of the storage media. Such a band is known as the "global band" and is illustrated in FIG. 2 as global band 240. The hard disk drive 141 illustrated in FIG. 2 further comprises additional bands 250 and 260, both of which are encrypted, and shown as the first encrypted band 250 and the second encrypted band 260.

In the embodiment illustrated by system 200 of FIG. 2, the first encrypted band 250 can be sized to encompass all of the first user-accessible partition 220 and the second encrypted band 260 can be sized to encompass all of the second user-accessible partition 230. In such a case, as will be known by those skilled in the art, data being written to the first user-accessible partition 220 will be identified as being within the first encrypted band 250 by the hardware cryptographic support 160 and the hardware cryptographic support can use whatever key is associated with the first band to encrypt the data prior to writing it to the storage media. Thus, as shown, an operating system, software applications, or other data that are stored within either the first user-accessible partition 220 or the second user-accessible partition 230 can be stored in an encrypted state, illustrated within FIG. 2 as encrypted operating system application and/or data 225 and 235, respectively.

As will also be known by those skilled in the art, the global band 240 can be associated with no key. Partitions that are not otherwise associated with another band, such as the system partition 210 can, by default, be associated with the global band 240. Consequently, the data stored within such partitions can not be encrypted by the hardware cryptographic support 160. While the partitions 220 and 230 can be user accessible, in that the user is aware of their existence and can instruct software applications to utilize such partitions, the system partition 210, as will be known by those skilled in the art, can be reserved by various operating systems that may be installed on one or more of the user-accessible partitions 220 or 230, and can be reserved in such a manner that the user is not aware of its existence.

Because the system partition 210 can comprise LBAs that are only part of the global band 240, and none of the encrypted bands, such as bands 250 and 260, the data stored within those LBAs can be stored in such a manner that it is neither encrypted nor decrypted by the hardware cryptographic support 160. Consequently, in one embodiment, existing resources and mechanisms, such as the full volume encrypting service 165 can store keys, such as keys 270 and 280 in the system partition 210. For ease of illustration and reference key A 270 is intended to represent any one or more related keys that can be utilized to access data stored within those LBAs that correspond to the first encrypted band 250 and, similarly, that can be utilized to encrypt data destined to be stored within those LBAs. Key B 280, likewise, is intended to represent any one or more related keys that can be utilized to encrypt and decrypt data stored within those LBAs corresponding to the second encrypted band 260.

In one embodiment, the keys stored in the system partition can include both the FVEK and the VMK. Thus, for example, key A 270 can represent the set of keys relevant to the data stored within the LBAs corresponding to the first encrypted band 260, including, for example, the FVEK for that data and the VMK with which that FVEK is encrypted. Similarly, key B 280 can represent the set of keys relevant to the data stored within the second encrypted band 260.

As stored on the storage media corresponding to the system partition 210, the keys, such as keys 270 and 280, can be encrypted. Thus, for example, if the FVEK and the VMK were both stored in the system partition 210, the FVEK could be stored in an encrypted state, having been encrypted by the VMK, and the VMK can be stored in an encrypted state having been encrypted by one or more keys associated with security information, such as passwords, PINs or keycards that can be provided by a user.

Subsequently, after a computing device, such as the computing device 100 of FIG. 1, has been restarted or powered on again, the full volume encryption service can obtain the security information, such as a password, PIN or keycard, from the user, and using such information can decrypt the encrypted VMK and then, with the VMK, can decrypt the FVEK. The FVEK can then be provided to the hardware cryptographic support 160 of the hard disk drive 141 to enable it to decrypt and encrypt data being read from, or written to, respective, the storage media of the hard disk drive. More specifically, and with reference to the system 200, after the computing device 100 has been restarted or powered on again, the full volume encryption service 165 can request, from the hard disk drive 141, the encrypted key A 270, for example. Because the key A 270 is stored within the system partition 210, the hardware cryptographic support 160 can identify the relevant LBAs in which such a key is stored as corresponding only to the global band 240 and can, consequently, determine that no key is required to read or write that data. Thus, while the key A 270 may be encrypted, such as an FVEK encrypted by a VMK, it can not be encrypted by the hardware cryptographic support 160 and can, therefore, be provided to the full volume encryption service 165 without first obtaining a decryption key.

Once the full volume encryption service 165 has obtained the key A 170, it can decrypt it in a known way, such as, for example, with reference to security information obtained from a user. Once decrypted, the key A 270 can be provided to the hardware cryptographic support 160 and the hardware cryptographic support can unlock the associated band, namely the first encrypted band 250. Subsequent reads from, and writes to, LBAs corresponding to the first encrypted band 250 can, thereafter, be decrypted and encrypted, respectively, by the hardware cryptographic support 160 with reference to the key A 270 provided by the full volume encryption service 165. In a similar manner, the full volume encryption service 165 can also obtain, from the hard disk drive 141, the key B 280, without first providing any key to the hardware cryptographic support 160, and can provide a decrypted version of the key B 280 to the hardware cryptographic support, thereby enabling the second encrypted band 260 to be unlocked.

Additionally, because, as indicated, the system partition 210 can be associated with the global band 240 and can, thereby, comprise data that is not encrypted or decrypted by the hardware cryptographic support 160, the system partition 210 can comprise other information that can be utilized at a time prior to the availability of keys necessary to enable the hardware cryptographic support to perform encryption or decryption. In one embodiment, the system partition 210, or any other partition associated with only the global band 240, can comprise a boot manager that can participate in the booting of the computing device 100. In another embodiment, the system partition 210, or, again, any other partition associated with only the global band, can comprise some or all of the computer-executable instructions that comprise the full volume encryption service 165, thereby enabling the operation and execution of those instructions prior to the providing of any keys to the hardware cryptographic support 160.

Because the key A 270 and the key B 280 are important to the accessing of some or all of the data stored within the first encrypted band 250 or the second encrypted band 260, a redundant copy of key A, labeled key A 271, and a redundant copy of key B, labeled key B 281, can also be stored within the system partition 210. In one embodiment, such redundant copies are stored in disparate locations of the system partition 210 such that if, for example, a hardware error, such as a defect in the storage media, resulted in key A 270 and key B 280 being unreadable, then the chances that such a defect would extend to the portion of the storage media on which redundant key A 271 and redundant key B 281 were stored, would be minimized.

Figure 3:
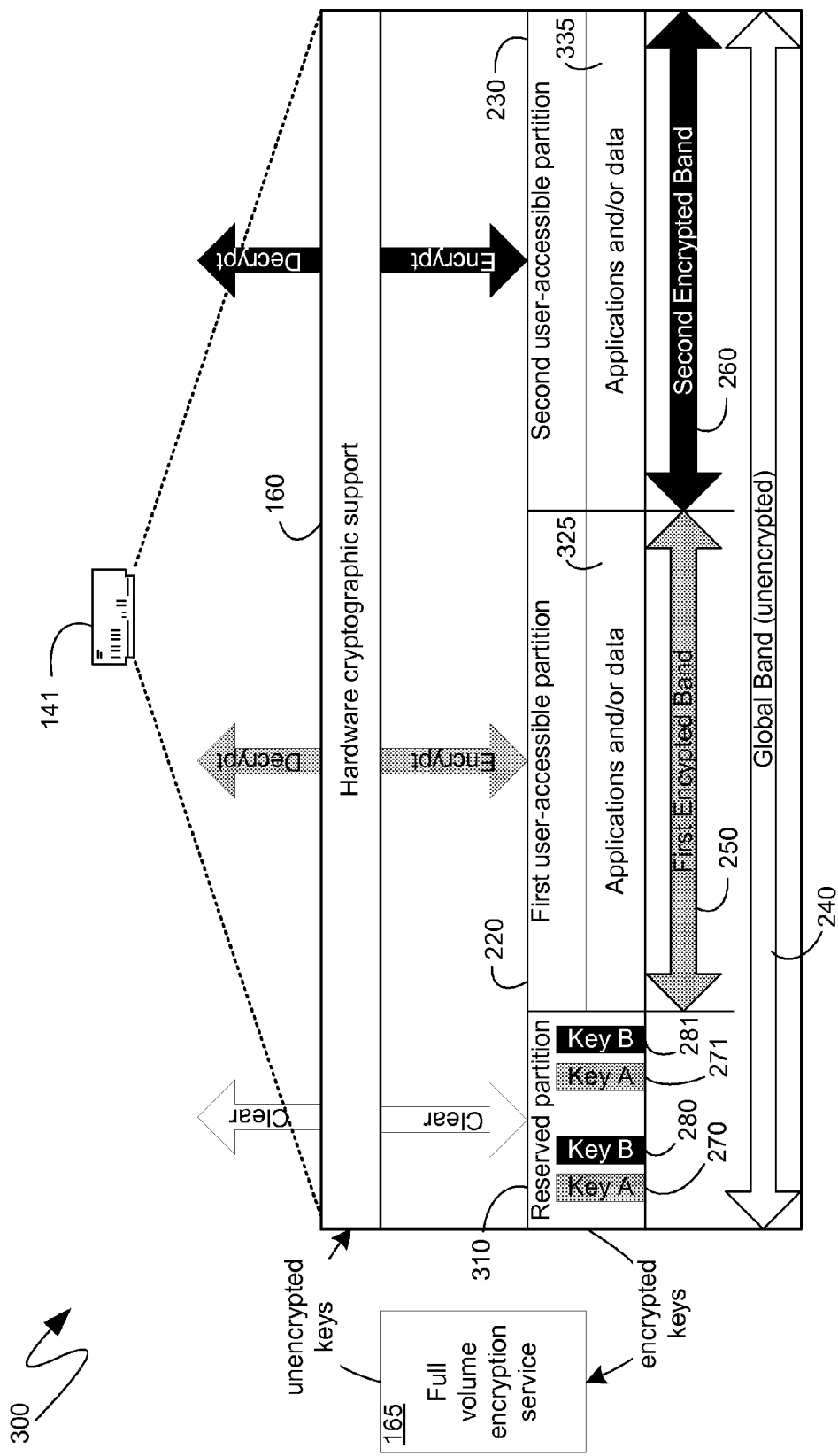
FIG. 3 is a block diagram of another exemplary hardware encrypting storage device having keys stored by computer-executable instructions executing on a computing device communicationally coupled thereto.

Turning to FIG. 3, system 300 illustrates a similar embodiment to system 200 except that, instead of storing the keys, such as key A 270 and key B 280, and their redundant copies key A 271 and key B 281, respectively, with the system partition 220, they can be stored within a reserved partition 310. As will be known by those skilled in the art, the system partition 210 can be created if the hard disk drive 141 has stored upon it an operating system, whereby the installation of the operating system can create the system partition 310. If however, the hard disk drive 141 does not have an operating system installed upon it, as indicated, for example, in system 300 of FIG. 3, a reserved partition 310 may exist. In one embodiment, the reserved partition 310 can be created when the hard disk drive 141 is formatted by an operating system or formatting utility that reserves such space. To illustrate the potential absence of an operating system, the information labeled "encrypted operating system, applications and/or data" 225 and 235, stored in the first user-accessible partition 220 and the second user-accessible partition 230 in FIG. 2, respectively, has been relabeled as "encrypted applications and/or data" 325 and 335, respectively.

As can be seen from the system 300 of FIG. 3, the reserved partition 310 can be utilized to store the keys 270 and 280, and their redundant backups 271 and 281, in the same manner as the system partition 210. Specifically, like the system partition 210, the reserved partition 310 can encompass LBAs that are only part of the unencrypted global band 240, while the other partitions, such as the first user-accessible partition 220 and the second user-accessible partition 230 can remain encrypted by virtue of their LBAs falling within bands specifying encryption, such as the first encrypted band 250 and the second encrypted band 260, respectively. Thus, the operation of system 300, with respect to the storage, maintenance and utilization of keys, such as keys 270, 280, 271 and 281 can be analogous to that described above.

Figure 4:
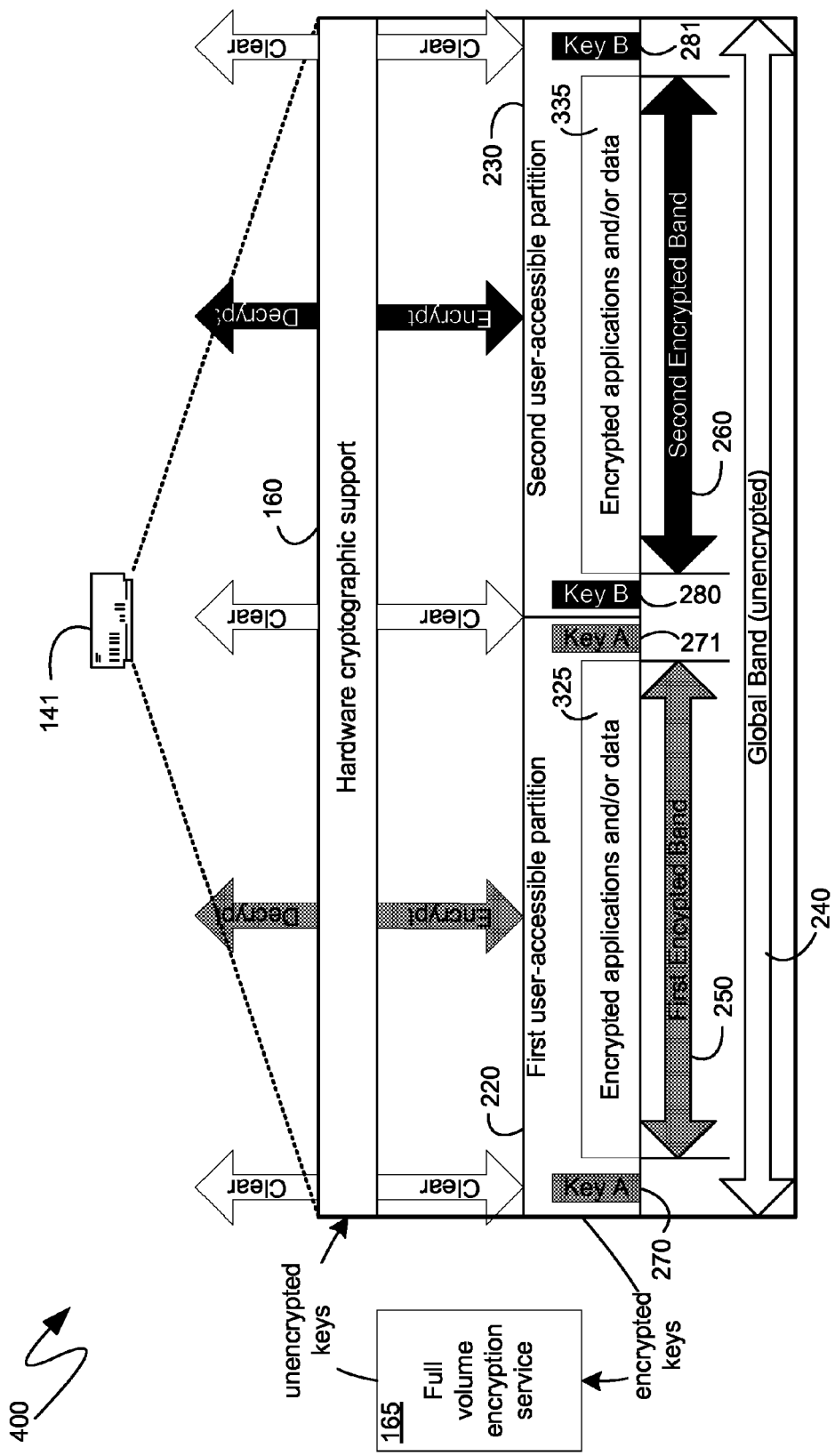
FIG. 4 is a block diagram of yet another exemplary hardware encrypting storage device having keys stored by computer-executable instructions executing on a computing device communicationally coupled thereto.

In another alternative embodiment, described with reference to system 400 of FIG. 4, the keys, such as key A 270 and key B 280, and any redundant keys, such as redundant key A 271 and redundant key B 281, can be stored within the partitions to which such keys are directed. As indicated previously, the keys, such as key A 270 and key B 280, can be stored in such a manner that they can be accessed by the full volume encryption service 165 without first providing a decryption key to the hardware cryptographic support 160. To store keys in such a manner, the encrypted bands corresponding to a partition can be specified to be slightly shorter than the partition and can further be specified to start at an LBA that is greater than the LBA that marks the beginning of the partition. Thus, as shown in FIG. 4, the first user-accessible partition 220 can have a corresponding first encrypted band 250 that is smaller than the first user-accessible partition, and is wholly contained within it. For example, if the first user-accessible partition 220 was specified to start at the first LBA, namely LBA 0000000000 and was specified to have a length of 1,000,000,000 LBAs, a corresponding first encrypted band 250 can be specified to start at, for example, LBA 0000001000 and can be specified to have a length of 999,998,000 LBAs. As can be seen from the system 400 of FIG. 4, a net result of such a specification is that the LBAs between LBA 0000000000 and LBA 0000000999 can be part of the global band 240, since the first encrypted band 250 does not start until LBA 0000001000. Similarly, the LBAs between LBA 0999999000 and LBA 0999999999 can also be part of the global band 240, since the first encrypted band 250 is specified to end at LBA 0999998999. Because the global band 240 is not associated with a key in the band table of the hard disk drive 141, and is not encrypted, information stored within the first 1000 LBAs of the first user-accessible partition 220, namely LBAs 0000000000 through 0000000999, and information stored within the last 1000 LBAs of the first user-accessible partition, namely LBAs 0999998999 and 0999999999, can be not encrypted by the hardware cryptographic support 160. The remaining information stored with the first user-accessible partition 220 will, therefore, be stored within LBAs that correspond to the first encrypted band 250 and, consequently, can be encrypted by the hardware cryptographic support 160, as shown, for example, by the encrypted applications and/or data 325.

The full volume encryption service 165 can, therefore, store, within those beginning or ending LBAs of the first user-accessible partition, keys that the full volume encryption service can itself encrypt or decrypt, but for which it does not need to provide keys to the hardware cryptographic support 160 to enable its encryption or decryption of that data. Thus, as shown in FIG. 1, a key A 270 associated with the first encrypted band 250 can be stored near the beginning of the first user-accessible partition 220, and a backup key A 271 can be stored near the end of the first user-accessible partition. When the computing device 100 is powered on or restarted, the full volume encryption service 165 can obtain the key A 270 from the hard disk drive 141 without first providing any key to the hardware cryptographic support 160, since the key A 270 is stored within LBAs corresponding to the unencrypted global band 240. After obtaining relevant security information from a user, the full volume encryption service 165 can decrypt the key A 270, which, as indicated previously, can represent one or more related keys, and can provide the relevant key to the hardware cryptographic support 160 to enable the hardware cryptographic support to decrypt and encrypt data being read from, or written to, respectively, that portion of the first user-accessible partition covered by the first encrypted band 250.

In one embodiment, the operating system 134, or other utilities, can enable a user of the computing device 100, or other applications executing on such a computing device, to only utilize those LBAs of the first user-accessible partition 220 that are covered by the first encrypted band 250. For example, a component, such as a volume manager, can apply an offset to each read and write command received with respect to the first user-accessible partition 220. Utilizing the above exemplary values, a write command to LBA 0000000000 could have an offset of 1000 automatically applied to it such that it, in reality, becomes a write command to LBA 0000001000. Such a write command would appear to write to the beginning of the first-user accessible partition 220, but would actually write to the beginning of the encrypted applications and/or data area 325 corresponding to the first encrypted band 250, thereby leaving the above described unencrypted sections for key storage. In such a manner, the first user-accessible partition 220 can appear, to the user, and to other applications executing on the computing device 100, to be a fully encrypted partition.

Another partition on the hard disk drive 141, such as, for example, the second user-accessible partition 230, can be similarly defined with respect to an associated encryption band, such as the second encrypted band 260. In such a case, a contiguous range of LBAs between those covered by the first encrypted band 250 and those covered by the second encrypted band 260 can exist, which can, as indicated previously, belong to the global band 240. Such a contiguous range of LBAs can, however, be split between the two partitions, such as between the first user-accessible partition 220 and the second user-accessible partition 230, in the manner shown in FIG. 4.

In another embodiment, rather than defining the first user-accessible partition 220 and the second user-accessible partition 230 to be contiguous, such as in the manner shown in FIG. 4, they can be staggered, leaving LBAs between them, before them, after them, or any combination thereof, that can be utilized in the same manner as described above for key storage. Thus, rather than offsetting reads and writes within the first user-accessible partition 220 and the second user-accessible partition 230, as indicated, the partitions themselves can be sized to leave "gaps" of LBAs that correspond only to the global band, which, as indicated, is not associated with any key. The key A 270 and key B 280, as well as any duplicate copies 271 and 281, respectively, can be stored as shown in FIG. 4, except that such storage locations would be, unlike what is shown in FIG. 4, outside of the first user-accessible partition 220 and the second user-accessible partition 230. Instead, the first user-accessible partition 220 would be sized equivalently to the encrypted applications and/or data 325 and the second user-accessible partition 230 would be sized equivalently to the encrypted applications and/or data 335, both shown in FIG. 4.

Figure 5:
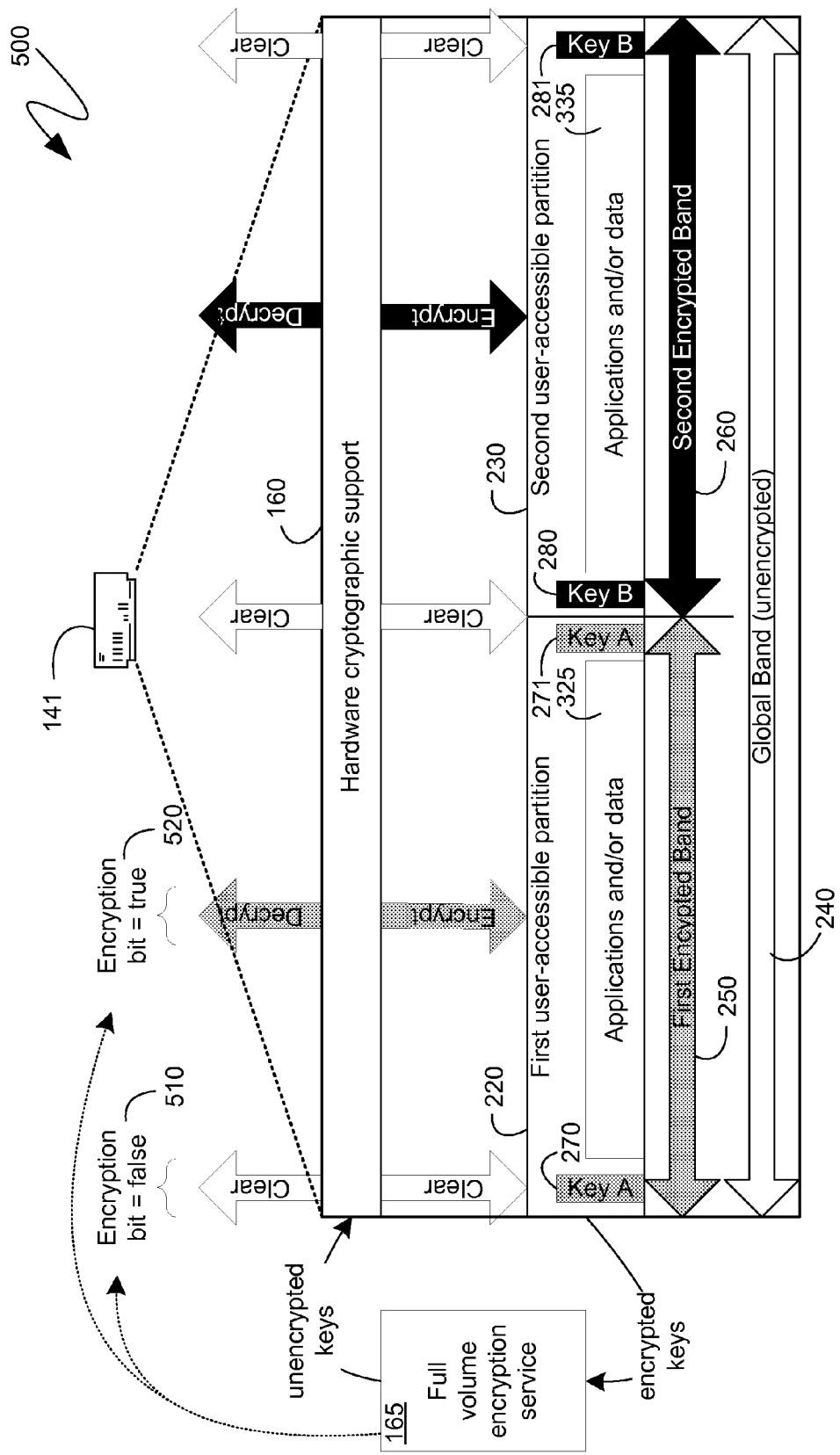
FIG. 5 is a block diagram of still another exemplary hardware encrypting storage device having keys stored by computer-executable instructions executing on a computing device communicationally coupled thereto.

In a further embodiment, such as that illustrated by the system 500 of FIG. 5, partitions and bands can be aligned with one another. Thus, for example, as shown, the first encrypted band 250 corresponding to the first user-accessible partition 220 can be specified to start at the same LBA as the first user-accessible partition and have the same length as the first user-accessible partition, and the second encrypted band 260 corresponding to the second user-accessible partition 230 can be specified to start at the same LBA as the second user-accessible partition and have the same length as the second user-accessible partition. In such a manner, all of the LBAs of the first user-accessible partition 220 can be part of the first encrypted band 250, and can be encrypted, and all of the LBAs of the second user-accessible partition 230 can be part of the second encrypted band 260, and can also be encrypted.

To store keys, such as the key A 270 or the key B 280 within their respective partitions, such as the first user-accessible partition 220 or the second user-accessible partition 230, respectively, a flag or bit can be utilized to specify to the hardware cryptographic support 160 of the hard disk drive 141 whether or not it should encrypt or decrypt the data being provided, or requested, respectively. More specifically, such a flag can be appended, or pre-pended, to the data blocks being communicated to the hard disk drive 141 by the computing device 100, and can be read and understood by the hardware cryptographic support 160. In one embodiment, such a flag or bit can be, by default, set to request encryption and decryption such that, should it not be specified, the hardware cryptographic support 160 can proceed to encrypt or decrypt the data.

The full volume encryption service 165 can, thereby, utilize the flag to specify that the keys, such as key A 270, are not be encrypted by the hardware cryptographic support 160 when written to the storage medium of the hard disk drive 141, nor are they to be decrypted by it when read from the storage medium. Thus, as shown in FIG. 5, the full volume encryption service 165 can utilize a false-specifying encryption bit 510 when providing, or requesting, the key A 270, while other software can utilize a true-specifying encryption bit 520 when providing, or requesting, other data. Although not specifically illustrated in FIG. 5, such an encryption bit can be utilized to store and retrieve key A 270, redundant key A 271, key B 280 and redundant key B 281 without invoking the encrypting and decrypting abilities of the hardware cryptographic support 160.

Additionally, although again not shown in FIG. 5, the storage of the keys, such as key A 270 and redundant key A 271, can be on any set of LBAs within the relevant partition, since specific gaps within the encryption bands, such as the first encrypted band 250, are not being utilized. Thus, a second set of redundant keys could be stored, for example, near the middle of each relevant partition through the use of a false-specifying encryption bit, such as false-specifying encryption bit 510.

To maintain established relationships, such as those described in detail above, between partitions, such as the first user-accessible partition 220 and the second user-accessible partition 230, and encryption bands, such as the first encrypted band 250 and the second encrypted band 260, respectively, one or more mechanisms can be established that monitor a partition table, maintained by the computing device 100, and specifying information regarding the partitions, and, if appropriate, communicate relevant adjustments to the hard disk drive 141 to be reflected within the band table, maintained by the hard disk drive, and specifying information regarding the bands. Alternatively, one or more mechanisms can be established that, when modifying partitions on a storage device, equally cause modification of a band table on, or associated with, that storage device.

Figure 6:
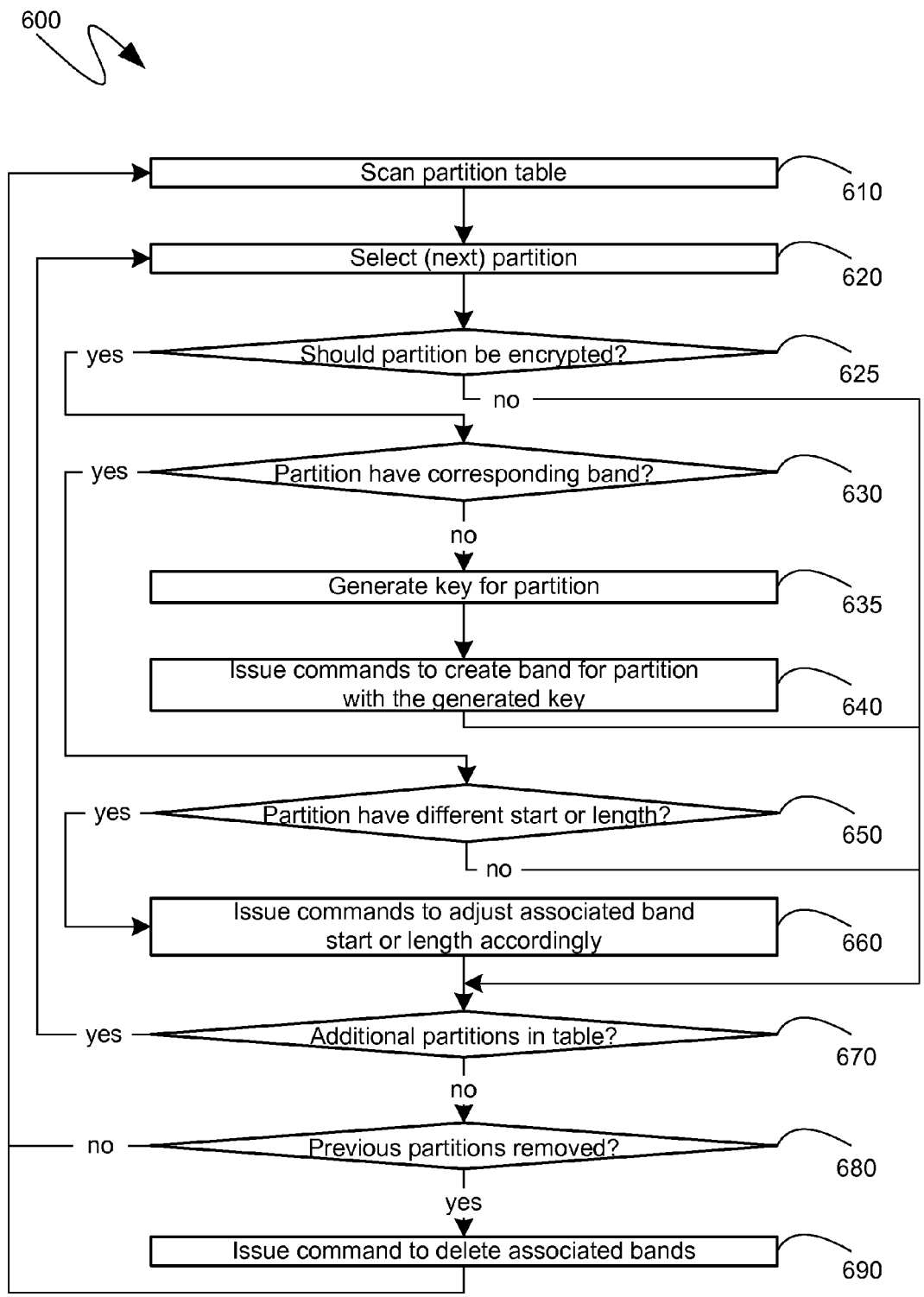
FIG. 6 is a flow diagram of an exemplary synchronization between a partition table and a band table.

Turning to FIG. 6, a flow diagram 600 is shown, illustrating one embodiment of the first such a mechanism. Initially, at step 610, the partition table can be scanned to identify information specified within the partition table, including, for example, the existence of one or more partitions, the specification of their starting LBAs, and the specification of their length. Subsequently, at step 620, one of the partitions identified at step 610 can be selected and a determination can be made, at step 625, as to whether or not the selected partition should be encrypted. As indicated previously, some partitions, such as the system partition 210 or the reserved partition 310, may not need to be encrypted and, consequently, may only, by default, correspond to the global band 240. If the partition should not be encrypted, then processing can proceed with step 670, described further below. However, if, at step 625, it is determined that the selected partition should be encrypted, then a subsequent determination, at step 630 can be made to determine if the partition already has a corresponding encryption band. If the partition is found not to have a corresponding band at step 630, other than the global band 240, then the partition may not yet be encrypted and, at step 635 a key can be generated for the partition and, at step 640, commands can be provided to the hard disk drive 141 to create a band for the partition utilizing the key generated at step 635. The precise command issued at step 640 can depend on which of the above described embodiments was selected for implementation. Thus, the commands to create the band at step 640 can specify a band that has the same starting LBA and length as the selected partition, or they can specify a band that has an offset starting LBA and a smaller length than the selected partition, for the reasons described above.

If a corresponding band is found for the selected partition at step 630, then, at step 650, a determination can be made if the partition has been modified, such as to its length or starting point. If the selected partition has been modified, as determined at step 650, then at step 660, commands can be provided to the hard disk drive 141 to adjust the corresponding band appropriately. As with the creation of the band at step 640, the precise commands issued at step 660 can depend on whether the corresponding band is supposed to be in parity with its corresponding partition, or whether it is supposed to be smaller, as described above.

After either the instruction to create a new band at step 640, the instruction to modify an existing band at step 660, or after a determination at step 650 that the selected partition has not changed and no changes or additions need to be communicated to the hard disk drive 141, or, as indicated previously, after a determination at step 625 that the selected partition should not be encrypted, a determination can be made, at step 670, as to whether there are any further partitions identified in the partition table. If there are such partitions, processing can return to step 620 and select the next partition and repeat the above described steps with respect to that partition. If, however, no such further partitions are identified at step 670, then, at step 680, a determination can be made as to whether any previously specified partitions were removed. If any such partitions were removed, as determined at step 680, an appropriate command can be provided to the hard disk drive 141 at step 690 to request removal of the corresponding band, if there was one. If no partitions were found to be removed at step 680, in one embodiment, processing can return to step 610, thereby continuously monitoring the partition table and communicating appropriate changes to the band table in an efficient manner.

Figure 7:
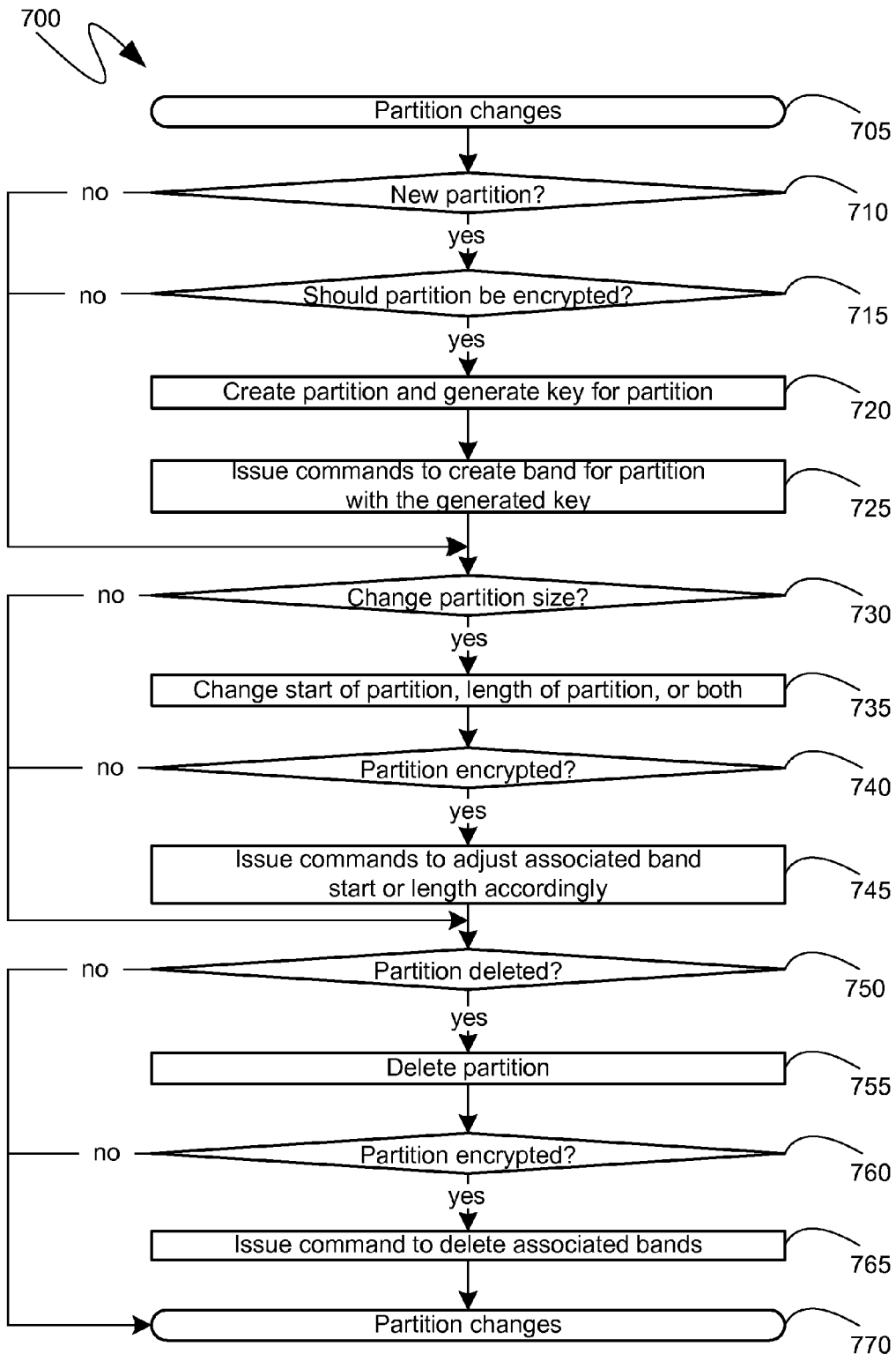
FIG. 7 is a flow diagram of another exemplary synchronization between a partition table and a band table.

In another embodiment, as indicated, rather than relying on synchronization mechanisms, such as those described above with reference to FIG. 6, changes to partitions can more directly cause changes, if appropriate, to the band table associated with the storage device whose partitions are being changed. Turning to FIG. 7, a flow diagram 700 illustrates an exemplary such mechanism. Specifically, partition changes at step 705 can be received and, at step 710 a determination can be made as to whether the requested changes comprise the creation of a new partition. If a new partition is being created, as determined by step 710, a subsequent determination can be made at step 715 as to whether such a partition should be encrypted. If such a partition should be encrypted, then, at step 720, the new partition can be created and one or more keys for the partition can be generated. Subsequently, at step 725, commands can be issued to create an encryption band corresponding to the partition, and utilizing the generated key. As indicated above with reference to steps 640 and 660, the precise commands issued at step 725 can depend on whether the corresponding band is supposed to be in parity with its corresponding partition, or whether it is supposed to be smaller, as previously described.

If the partition change was not the creation of a new partition, as determined at step 710, or if the new partition did not need to be encrypted, as determined at step 715, a determination, at step 730, can evaluate whether one or more partition changes are directed to a change in the size of an existing partition. If an existing partition is being changed, its start or length can be modified at step 735 in a manner known to those skilled in the art. Subsequently, a determination can be made, at step 740, as to whether the changed partition was encrypted. If it was, then, at step 745, commands to adjust its associated bands can be issued. As before, such commands can depend on the selected relationship, from among those described above, between the partition and its corresponding encryption band.

If no partition change was requested, as determined at step 730, or if the partition being changed did not need to be encrypted, processing can proceed to step 750 to determine if any of the one or more changes to the partitions comprise the deletion of partitions. If there is no such request for the deletion of a partition, the relevant processing can end at step 770. However, if, at step 750, a request to delete a partition is found, then, at step 755, the requested partition can be deleted and, at step 760, a determination can be made as to whether the deleted partition was encrypted. If it was, commands to remove its associated band can be issued at step 765. If the deleted partition was not encrypted, then its deletion at step 755 was sufficient, and the relevant processing can end at step 770. In such a manner, one or more band tables associated with the storage device having partition can be maintained in parity with any changes to those partitions.

Figure 8:
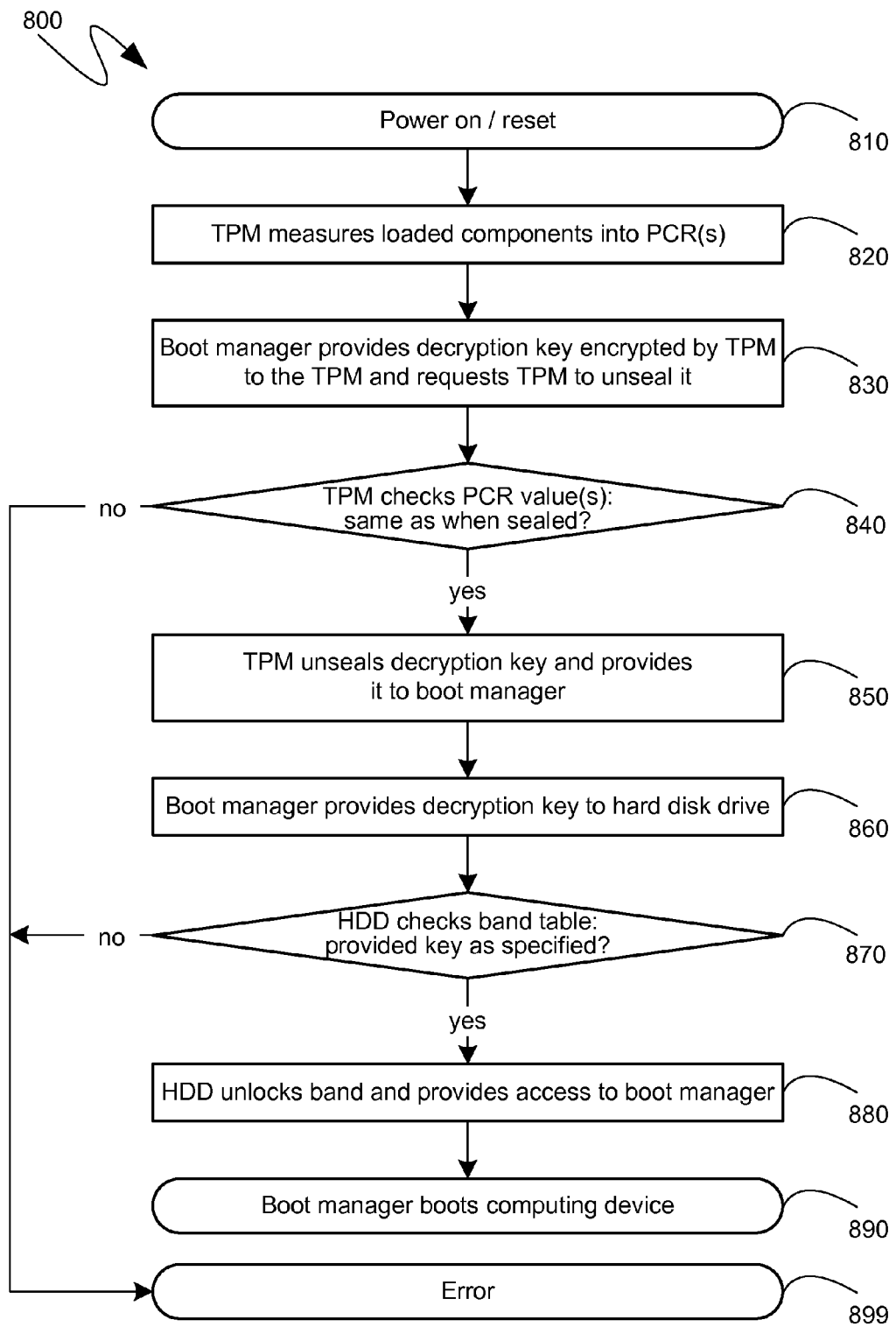
FIG. 8 is a flow diagram of an exemplary booting utilizing a trusted platform module to protect a key utilized by a hardware encrypting storage device.

In a further embodiment, one or more of the keys, such as key A 270 and key B 280, associated with one or more of the encrypted bands, such as the first encrypted band 250 or the second encrypted band 260, can be associated with information protected by the TPM 150 of the computing device 100, thereby essentially tying the hard disk drive 141 to the computing device. More specifically, and with reference to the flow diagram 800 of FIG. 8, after an initial event 810, whereby power is applied to the computing device 100, or the computing device is otherwise reset, the TPM can, at step 820, as will be known by those skilled in the art, extend one or more PCRs with the measured values of components loaded or executed on the computing device. At a subsequent time, at step 830, the boot manager can provide an encrypted bundle data to the TPM 150, which represents, for example, a key, such as the VMK, or even the FVEK, that was previously encrypted by the TPM using one or more of the TPM-specific keys 151. The boot manager can, also at step 830, request that the TPM 150 unseal the key.

As will be known by those skilled in the art, the TPM 150 can, at step 740, determine whether or not to unseal the sealed, or encrypted, key that was provided to it at step 730 based on the values of one or more PCRs. More specifically, if the PCR values are equivalent to their value when the key was initially sealed, the TPM 150 can, at step 750, unseal the key and return it to the boot manager. If, at step 840, the TPM 150 determines that the PCR values are different, such as, for example, if some of the hardware of the computing device 100 has changed, or if the entire computing device has changed, then the TPM 150 can determine not to unseal the key, resulting in an error at step 899.

If the TPM 150 provides the unsealed key, at step 850, then, at step 860, the boot manager can provide the key, or an associated key unlocked by the key provided at step 850, to the hard disk drive 141. The hardware cryptographic support 160 of the hard disk drive 141 can verify, at step 870, that the key provided is appropriate to unlock one or more encrypted bands and properly encrypt and decrypt data being written to, and read from, the LBAs corresponding to that band. If the key is found, at step 870, to be appropriate, the band can be unlocked at step 880 and access to it can be provided through the hardware cryptographic support 160. If, however, the key is not found to be the key specified in the band table, at step 870, then again, at step 899, an error can occur.

In one embodiment, the unlocking of the band at step 880 can enable the boot manager to have access to additional computer-executable instructions relevant to the booting of the computing device 100. In such an embodiment, at step 890, the boot manager can, after receiving access to the band at step 880, proceed to boot the computing device 100. Since the boot manager may not, as indicated at steps 840 and 850, receive the keys it needs if the hard disk drive 141 has been moved to another computing device 100, one net effect of the steps of flow diagram 800 is to tie the access of the data stored on the hard disk drive to the computing device it was connected to when the data was encrypted.

As can be seen from the above descriptions, the utilization of existing resources for the creation, protection and management of keys can be provided for within the context of hardware encrypting storage devices. In view of the many possible variations of the subject matter described herein, we claim as our invention all such embodiments as may come within the scope of the following claims and equivalents thereto.

We claim:

1. One or more computer-readable storage media comprising computer-executable instructions for storing and retrieving keys from a hardware encrypting storage device, the computer-executable instructions directed to steps comprising:
    creating at least a first partition and a second partition on the hardware encrypting storage device;
    instructing the hardware encrypting storage device to implement at least a first encryption band corresponding to the second partition, the first encryption band covering all storage units associated with the second partition, the first encryption band being associated with a first key;
    storing an encrypted key associated with the first key within a first set of one or more storage units associated with the first partition, the first partition corresponding to at least a global band, the global band being associated with no key;
    monitoring a partition table comprising information regarding the at least the first partition and the second partition to detect a change of the second partition; and
    instructing the hardware encrypting storage device to change the first encryption band if the second partition is changed, the instructed change of the first encryption band corresponding to the change of the second partition.

2. The computer-readable media of claim 1, wherein the computer-executable instructions directed to the creating the at least the first partition and the second partition are executed in response to a user request to create only one partition.

3. The computer-readable storage media of claim 1, comprising further computer-executable instructions directed to installing, on the hardware encrypting storage device, an operating system, the computer-executable instructions directed to installing the operating system comprising: the computer-executable instructions directed to the creating the at least the first partition and the second partition to the hardware encrypting storage device; and computer-executable instructions directed to reserving the first partition for use by the operating system.

4. The computer-readable storage media of claim 1, comprising further computer-executable instructions directed to instructing the hardware encrypting storage device to implement at least a second encryption band corresponding to the first partition, the second encryption band covering all storage units associated with the first partition, the second encryption band being associated with no key.

5. The computer-readable storage media of claim 1, comprising further computer-executable instructions directed to storing a redundant encrypted key associated with the first key within a second set of one or more storage units associated with the first partition, the second set of one or more storage units being disparate from the first set of one or more storage units.

6. The computer-readable storage media of claim 1, wherein the computer-executable instructions directed to the creating at least the first partition and the second partition comprise further computer-executable instructions directed to creating at least a third partition, the computer-readable media further comprising computer-executable instructions directed to: instructing the hardware encrypting storage device to implement at least a second encryption band corresponding to the third partition, the second encryption band covering all storage units associated with the third partition, the second encryption band being associated with a second key; and storing a second encrypted key associated with the second key within a second set of one or more storage units associated with the first partition.

7. The computer-readable storage media of claim 1, wherein the encrypted key was encrypted by a trusted platform module associated with a computing device to which the hardware encrypting storage device is communicationally coupled.

8. The computer-readable storage media of claim 1, comprising further computer-executable instructions directed to: receiving a request to change the second partition on the hardware encrypting storage device; and changing the second partitions on the hardware encrypting storage device in accordance with the request; wherein the instructing the hardware encrypting storage device to change the first encryption band is performed in response to the receiving the request and the changing the second partition.

9. One or more computer-readable storage media comprising computer-executable instructions for storing and retrieving keys from a hardware encrypting storage device, the computer-executable instructions directed to steps comprising:
    creating at least one partition on the hardware encrypting storage device, the at least one partition encompassing all storage units from a first storage unit to a second storage unit;
    instructing the hardware encrypting storage device to implement at least one encryption band associated with a key and corresponding to the at least one partition, the at least one encryption band encompassing all storage units from a third storage unit to a fourth storage unit, wherein the third and fourth storage units are between the first and second storage units such that storage units between the first and third storage units are part of the at least one partition, but are not part of the at least one encryption band corresponding to the at least one partition and such that storage units between the fourth and second storage units are also part of the at least one partition, but are also not part of the at least one encryption band corresponding to the at least one partition;

providing, to other computer-executable instructions, access to only a portion of the at least one partition, the portion encompassing all storage units from the third storage unit to the fourth storage unit; and storing an encrypted key associated with the key either in a first key storage area between the first storage unit and the third storage unit or in a second key storage area between the fourth storage unit and the second storage unit, wherein both the first key storage area and the second key storage area correspond to at least a global band, the global band being associated with no key.

10. The computer-readable storage media of claim 9, comprising further computer-executable instructions directed to storing a redundant encrypted key associated with the key in an other of the first key storage area or the second key storage area.

11. The computer-readable storage media of claim 9, comprising further computer-executable instructions directed to intercepting a read or write command; and offsetting the intercepted read or write command by an amount of storage units equivalent to a difference between the first storage unit and the third storage unit.

12. The computer-readable storage media of claim 9, comprising further computer-executable instructions directed to: detecting changes in a partition table comprising information regarding the at least one partition; and instructing the hardware encrypting storage device to correspondingly change information in a band table comprising information regarding the at least one encryption band.

13. The computer-readable storage media of claim 9, wherein the encrypted key was encrypted by a trusted platform module associated with a computing device to which the hardware encrypting storage device is communicationally coupled.

14. A hardware encrypting storage device comprising:
one or more storage media comprising storage units; and
one or more cryptographic processors for performing steps comprising:
receiving provided information to be stored in one or more storage units of the one or more storage media, together with a first encryption flag indicating whether the provided information is to be stored in an encrypted or unencrypted manner;

storing the provided information, unencrypted in the one or more storage units if the first encryption flag received with the provided information indicated that the provided information was to be stored in the unencrypted manner, even if at least some of the one or more storage units are pan of a first encryption band specifying that information stored in storage units encompassed by the first encryption band is to be encrypted by the one or more cryptographic processors prior to storage on the storage media;

receiving a request for specified information to be read from one or more storage units of the one or more storage media, together with a second encryption flag indicating whether the spec information, as read from the one or more storage units, is to be decrypted or not decrypted; and providing the specified information, as read from the one or more storage units, and not decrypt if the second encryption flag received with the request indicated that the specified information was to be provided not decrypted, even if at least some of the one or more storage units are part of a second encryption band specifying that information read from storage units encompassed by the second encryption band is to be decrypted one or more cryptographic processors prior to provision.

15. The hardware encrypting storage device of claim 14, wherein the provided information comprises an encrypted version of at least one key that is associated with the first encryption band.

16. The hardware encrypting storage device of claim 14, further comprising a band table, the band table identifying the first encryption band and at least one key associated with the first encryption band.

17. The hardware encrypting storage device of claim 16, wherein the one or more storage media is partitioned into at least one partition, and wherein further the first encryption band corresponds to the at least one partition and encompasses all of the storage units of the one or more storage media that are encompassed by the at least one partition.

18. The hardware encrypting storage device of claim 16, wherein the band table is maintained in parity to a partition table maintained by a computing device to which the hardware encrypting storage device is communicationally coupled.

19. The hardware encrypting storage device of claim 14, wherein the first encryption band is the second encryption band.

* * * * *